(12) United States Patent
Lessman

(10) Patent No.: US 7,949,754 B2
(45) Date of Patent: May 24, 2011

(54) METHOD AND APPARATUS FOR PRESCRIBING STATION IDENTIFIERS IN A PROFIT IO NETWORK

(75) Inventor: Gunnar Lessman, Nieheim (DE)

(73) Assignee: Phoenix Contact GmbH & Co. KG (DE)

( * ) Notice: Subject to any disclaimer, the term of this patent is extended or adjusted under 35 U.S.C. 154(b) by 574 days.

(21) Appl. No.: 11/341,316

(22) Filed: Jan. 26, 2006

(65) Prior Publication Data

US 2006/0173955 A1 Aug. 3, 2006

(30) Foreign Application Priority Data

Jan. 28, 2005 (DE) .......................... 10 2005 004 265

(51) Int. Cl.
*H04L 12/28* (2006.01)
(52) U.S. Cl. ..................... 709/226; 709/223; 709/203
(58) Field of Classification Search .................. 709/203, 709/200
See application file for complete search history.

(56) References Cited

U.S. PATENT DOCUMENTS

| | | | | | |
|---|---|---|---|---|---|
| 4,335,426 | A | * | 6/1982 | Maxwell et al. | 709/222 |
| 5,315,287 | A | * | 5/1994 | Sol | 340/455 |
| 5,949,776 | A | * | 9/1999 | Mahany et al. | 370/338 |
| 6,061,724 | A | * | 5/2000 | Ries et al. | 709/224 |
| 6,351,258 | B1 | * | 2/2002 | Satoh | 345/168 |
| 6,674,537 | B2 | * | 1/2004 | Kadowaki | 358/1.15 |
| 7,159,007 | B2 | * | 1/2007 | Stawikowski | 709/202 |
| 2002/0120723 | A1 | * | 8/2002 | Forth et al. | 709/221 |
| 2004/0139187 | A1 | | 7/2004 | Park | 709/223 |
| 2004/0184467 | A1 | | 9/2004 | Watanabe | |
| 2004/0199267 | A1 | * | 10/2004 | Hammer et al. | 700/1 |
| 2004/0205246 | A1 | * | 10/2004 | Park | 709/245 |
| 2004/0208184 | A1 | * | 10/2004 | Tanaka et al. | 370/397 |
| 2005/0020236 | A1 | * | 1/2005 | Mauney et al. | 455/403 |
| 2005/0066104 | A1 | * | 3/2005 | Train et al. | 710/305 |
| 2005/0204061 | A1 | * | 9/2005 | Farchmin et al. | 709/245 |
| 2005/0232233 | A1 | * | 10/2005 | Lobig et al. | 370/352 |
| 2006/0002404 | A1 | * | 1/2006 | Igarashi | 370/401 |
| 2006/0259744 | A1 | * | 11/2006 | Matthes | 712/220 |
| 2006/0274749 | A1 | * | 12/2006 | Beier | 370/389 |
| 2009/0310148 | A1 | * | 12/2009 | Kadowaki | 358/1.6 |

FOREIGN PATENT DOCUMENTS

| | | | |
|---|---|---|---|
| EP | 68831 A2 | * | 1/1983 |
| JP | 11213278 A | | 8/1999 |
| JP | 2004-201250 A | | 7/2004 |

OTHER PUBLICATIONS

Kleines et al. Performance Aspects of Profinet IO IEEE Transactions on Nuclear Science, vol. 55, No. 1, Feb. 2008, pp. 1-4.*
Poschmann et al. Architecture and Model of Profinet IO IEEE AFRICON 2004.*
IEC 625-bus Wikipedia ttp://64.233.179.104/translate_c?hl=en&langpair=de%7Cen&u=http://de.wikipedia.org... Apr. 24, 2008.*
Ferrari et al., "Experimental evaluation of PROFINET performance," Factory Communication Systems, 2004. Proceedings. 2004 IEEE International Workshop., Sep. 22-24, 2004.*
Poschmann et al., AFRICON, 2004. 7th AFRICON Conference in Africa, IEEE., Sep. 2004.*
IEC 625 Bus—Wikipedia, "ikipedia.org/w/index.php?title=IEC-625-Bus&oldid=4482152".
Hilscher, "AC31 Series 90 Control", "'Ethrnet Device Configuration' Tool", 2004, Publisher: Current Screenshot from the Hilscher company with identifier of an AC31 series 90 control unit from ABB Stotz-Kontakt, Published in: DE.
Stotz-Kontakt GMBH , "CD Cover ", "Programming software 907 AC 1131, GJP5 2069 00", 2004, pp. 1-12, vol. 5.1, No. R0102, Publisher: ABB, ABB Stotz-Kontakt GmbH, Published in: DE.
"Documentation of the file 2CDC120066M0102.PDF System Description for Advant Controller 31", "Advant Controller", 2003, pp. F 4-4, vol. 4, Publisher: Decentralized Intelligent Automation technology.
"Documentation file 2CDC120059M0102.PDF from the CD according to publication", "System Description for Advant Controller 31", 2003, pp. F4-4, Publisher: Decentralized Intelligent Automation Technology,Automation Technology, Hardware Series 90.
ABB Stotz-Kontakt GMBH, "Control IT AC31/S500 automation technology,", "Brochure No. 2CDC 120085 B0201", 04/04, pp. 16-17, Publisher: ABB Stotz-Kontakt GmbH.
Joachim Gerstein, "EP Application No. EP 06 000 871 Opposition", Aug. 7, 2008, Publisher: EPO, Published in: EP.
Dr. Andreas Mueller, "EP Application No. EP 1 686 767 B1 Opposition", Aug. 13, 2008, Publisher: EPO, Published in: EP.
"Open Solution for the World of Automation", "Profibus, Technologie und Anwendung, Systembeschneibung,", Oct. 2002, Publisher: Internet excerpt from http://www.profibus.com/pall/meta/downloads/article/00454/, Published in:DE.
Siemans AG, "Simatic Net CP1512 Installation Guide", 2001, vol. 12, Publisher: Siemens AG.
Y. Fukuoka, "Japanese Application No. 2006-018509 Office Action", Sep. 15, 2009, Publisher: JIPO, Published in:JP.
ABB Stotz-Kontakt GMBH, "Advant Contoller 31, Local, Intelligent Automation, Systems Engineering 90", , Publisher: URL: http://www05.abb.com/global/scot/scot209.nsf/veritydisplay/6f2bf1381a2d1de9c1256df2004719e6/$file/2cdc120066m0102.pdf.
Popp et al, "Der Schnelleinstieg in PROFINET (The Rapid Way to PROFINET)", Published in: Germany.

* cited by examiner

*Primary Examiner* — Wing F Chan
*Assistant Examiner* — Kostas Katsikis
(74) *Attorney, Agent, or Firm* — DeMont & Breyer LLC

(57) ABSTRACT

The invention relates to the development of a Profinet IO compatible subscriber device having a selector switch such that the station identifier is obtained directly from the respective setting of the selector switch in combination with a firmly prescribed group identifier which is specific to a respective particular group of subscriber devices.

5 Claims, No Drawings

METHOD AND APPARATUS FOR PRESCRIBING STATION IDENTIFIERS IN A PROFIT IO NETWORK

FIELD OF THE INVENTION

The invention relates to a method and an apparatus for allocating subscriber device addresses in a Profinet IO network.

BACKGROUND OF THE INVENTION

It is known that the Profinet IO is the Ethernet-based automation standard from the Profibus user organization (PNO) and is essentially 100% based on the Ethernet standard (according to IEEE 802.3), operates in full duplex mode and supports switched Ethernet at a transmission rate of 100 Mb/s. This means that process and production data are available not just at the field level but rather can seamlessly enter multiregional data acquisition systems, so that it also becomes possible to integrate local peripheral areas in a vertical direction.

In contrast to Profibus, which operates on the basis of the "master-slave model", Profinet IO operates essentially on the basis of the producer-consumer model. This saves call telegrams, inter alia, and means that an entire group of "consumers", that is to say the network subscribers connected in the Profinet IO network, such as I/O components and field transmitters, is reached simultaneously with one telegram, so that this allows very efficient homogeneous integration of the world of automation into the IT environment. In addition, besides the known, tried and tested Profibus standards the integration of other field bus concepts within the Profinet IO concept is also ensured.

One fundamental difference between Profibus and Profinet IO applications is the different addressing of the devices of the network subscribers incoporated or to be incorporated in a respective network.

In contrast to the Profibus, the respectively incorporated network subscribers within a Profinet IO network are addressed using each subscriber device's own distinct MAC address and also a logical IP address which is distinctly associated with this physical address. IP addresses are conventionally allocated using DHCP (Dynamic Host Configuration Protocol), a mechanism comparable therewith or using the Profinet-IO-specific protocol DCP (Discovery Configuration Protocol). Specifications recommend the use of DHCP in large installations and of DCP in small installations.

Before the physical and logical network addresses are associated, however, each Profinet IO network subscriber needs to be allocated a symbolic name for identification in the network for the purpose of subsequent distinct addressing. This symbolic name, subsequently called station identifier, must usually be of DNS (Domain Name Service) compliant structure and is set on the network subscriber before said subscriber can be operated in a Profinet IO system. This allocation is frequently also called "baptism".

In this context, the station identifier is allocated manually using a software tool, with the station identifier to be allocated and the subscriber being associated by means of the distinct Ethernet MAC address. The setting is then made by the user using a software tool with the aid of a network-subscriber-specific engineering tool or using the network by supporting defined DCP services.

When the station identifier is allocated, the user therefore needs to know the respective MAC address.

Whether a network subscriber subsequently receives its IP address from the IO controller or obtains it or reads it from a DHCP server can also be stipulated within this context.

If the IO controller allocates IP addresses, the IO controller loads a nominal configuration for IO network subscriber devices from its engineering system, the station identifier being prescribed for each IO network subscriber device.

Using a special DCP service (Identify), multicasting is then used to look for the network subscriber which belongs to a particular station identifier. In the response, this network subscriber returns its own MAC address. A DCP service (Set-IP) is then used by the IO controller to assign each IO network subscriber its nominal IP address. Following this association, the network subscriber needs to initialize its TCP/IP stack with this address. When the IP address has been set successfully, a communication link is set up to the IO network subscriber.

In this context, the nominal IP address may already be held in the nominal configuration or is read from a DNS server by the IO controller.

With regard to the allocation of the station identifier on the basis of the prior art, further fundamental drawbacks arise particularly when a network subscriber is interchanged, since an interchanged device in the Profinet IO system must first of all be provided with the original station identifier again.

In the case of repair, this is frequently possible only with special knowledge, particularly when a complex software tool needs to be used.

If the station identifier is filed in the device on a removable storage medium, which is easily interchanged in principle, however, this results in increased costs. In addition, there is the increased opportunity for theft, particularly if standard media which are in circulation, such as Compact Flash memory cards, are used.

In addition, the manual operation of allocating station identifiers is susceptible to error and is a complex process overall.

There is, therefore, a need to demonstrate a way of ensuring the allocation of station identifiers, which are needed in Profinet IO systems and on the basis of which the subsequent automatic network subscriber device addressing is performed by ascertaining and associating logical and physical addresses, in a much simpler and more error-resistant manner.

SUMMARY OF THE INVENTION

The present invention relates to the development of a Profinet IO compatible subscriber device. In accordance with the illustrative embodiment of the present invention, the Profinet compatible device comprises a selector switch such that the station identifier is obtained directly from the respective setting of the selector switch in combination with a firmly prescribed group identifier which is specific to a respective particular group of subscriber devices.

DETAILED DESCRIPTION

The invention thus provides for the development of a Profinet IO compatible subscriber device having a selector switch such that the station identifier is obtained directly from the respective setting of the selector switch in combination with a firmly prescribed group identifier which is specific to a respective particular group of subscriber devices.

Prescribing a Profinet IO compatible station identifier by setting a selector switch, which is arranged directly on the device, such that a network subscriber device identifier is generated by the respective setting of the switch in combination with an identifier element which is firmly prescribed for each Profinet IO compatible device and which is stipulated for a specific device group which includes the device solves all the problems of the prior art which are described above.

In addition, the automatic allocation of a respective network subscriber device identifier on the basis of an identifier element which is firmly prescribed for a respective group, including subgroups and types with which the device is associated, and on the basis of a second identifier element which can be individually set directly on the device significantly increases the total number of subscriber devices which can easily be addressed in the network within a Profinet IO compatible machine/installation, since the settable identifier element needs to be distinct only within all the network subscriber devices in a group, but can be set multiple times in the case of different network subscriber device types.

These address selector switches may be in the form of rotary selector switches or "DIP" (Dual Inline Package) switches, for example.

Examples of network subscriber groups which each have a firmly associated common group identifier are sensors, actuators, bus couplers or I/O servers for the peripheral area of an installation.

If, in one preferred development, a plurality of selector switches are provided on the device, the device's internal logic means that the settable identifier element can be divided into further identifier sub elements, so that a more extensive increase in the number of addressable network subscriber devices is ensured within a machine/installation in a Profinet IO system.

The invention is described below with reference to an exemplary embodiment.

A user uses a plurality of network subscriber devices of type "A" and of type "B" in his machine/installation which is embedded within a Profinet IO system. By way of example, five network subscribers of type "A" and four network subscribers of type "B" need to be incorporated in the system. On the five network subscribers of type "A", an address selector switch formed on the device is used to set the numbers "1", "2", "3", "4" and "5". Accordingly, he sets the numbers "1", "2", "3" and "4" on the network subscribers of type "B" by operating the corresponding address selector switches on the device. From responses, the respective station identifiers are automatically ascertained in a combination comprising a type identifier and the selection using the address selector switch, e.g. "A1", "A2", "A3", "A4", "A5", "B1", "B2", "B3" and "B4". Next, logical and/or physical network subscriber addresses can be allocated and associated using the station identifiers.

When a device is interchanged, the same position of the address selector switch merely needs to be set on the "new" device as on the "old" device which is to be interchanged. This automatically results in the identical station identifier for the interchanged device.

What is claimed is:

1. A Profinet compatible device having
   an address selector switch that is designed to receive a setting,
   the Profinet compatible device being designed to generate a station identifier from
   (i) the setting received by the address selector switch, in combination with
   (ii) a group identifier that is (a) firmly prescribed for the Profinet compatible device and (b) associated with a specific device group that includes the Profinet compatible device,
   whereby a logical network subscriber device address and a physical network subscriber device address can be allocated based on the station identifier, with the station identifier being allocated as a symbolic name prior to allocation of the logical network subscriber device address and the physical network subscriber device address.

2. The Profinet compatible device as claimed in claim 1, having a firmly prescribed identifier for identifying another device that is associated with a specific group of sensors, actuators, bus couplers or I/O servers for the peripheral area of an installation.

3. A method for prescribing, on a Profinet IO compatible device, a station identifier, the method comprising:
   receiving a setting via an address selector switch; and
   combining (i) the setting received by the address selector switch with (ii) a group identifier that is (a) firmly prescribed for the Profinet IO compatible device and (b) associated with a specific device group, resulting in the station identifier,
   whereby logical network subscriber device addresses and physical network subscriber device addresses can be subsequently allocated based on the station identifier, with the station identifier being allocated as a symbolic name prior to allocation of the logical network subscriber device addresses and the physical network subscriber device addresses.

4. The method of claim 3, wherein the address selector switch is in the style of a rotary selector switch or a DIP switch.

5. A method for prescribing, on a Profinet IO compatible device, a station identifier being allocated as a symbolic name prior to associating a logical network subscriber device address and a physical network subscriber device address, the method comprising:
   sensing a selector switch arranged directly on the Profinet IO compatible device as having been set to a desired selector position;
   in response to the selector switch having been set, automatically generating the station identifier associated with the Profinet IO compatible device, based on
   (i) the desired selector position that is set on the selector switch, and
   (ii) a group identifier that is (a) firmly prescribed for the Profinet IO compatible
   device and (b) associated with a specific device group that includes the Profinet IO compatible device; and
   allocating the logical network subscriber device address and the physical network subscriber device address, based on the station identifier generated.

* * * * *